Nov. 10, 1936.　　　W. J. SPENGLER　　　2,060,259
MAGNETO GENERATOR
Filed Nov. 28, 1934　　　4 Sheets-Sheet 1

Witness:
Burr W. Jones

INVENTOR
Walter J. Spengler
BY Clinton S. Jones
ATTORNEY

Nov. 10, 1936.  W. J. SPENGLER  2,060,259
MAGNETO GENERATOR
Filed Nov. 28, 1934  4 Sheets-Sheet 3

INVENTOR
Walter J. Spengler
BY Clinton S. Jones
ATTORNEY

Witness:
Burr W. Jones

Nov. 10, 1936.   W. J. SPENGLER   2,060,259
MAGNETO GENERATOR
Filed Nov. 28, 1934   4 Sheets-Sheet 4
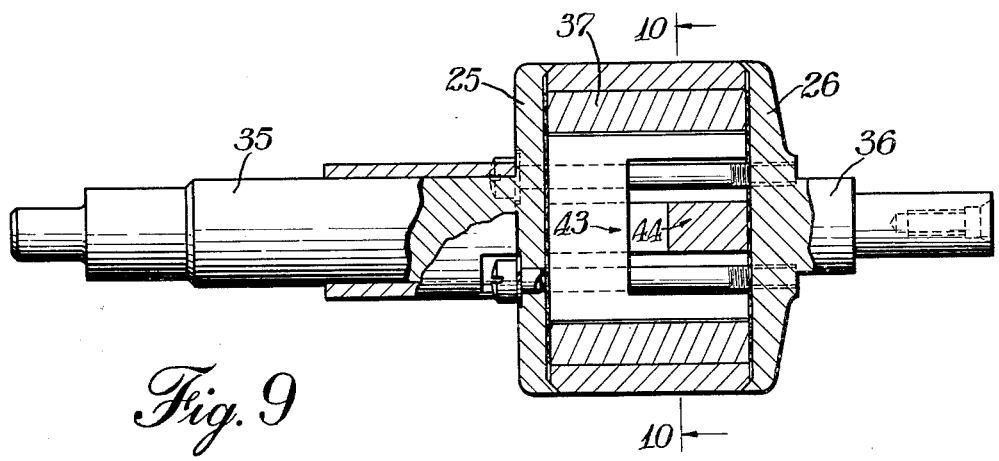
Fig. 9
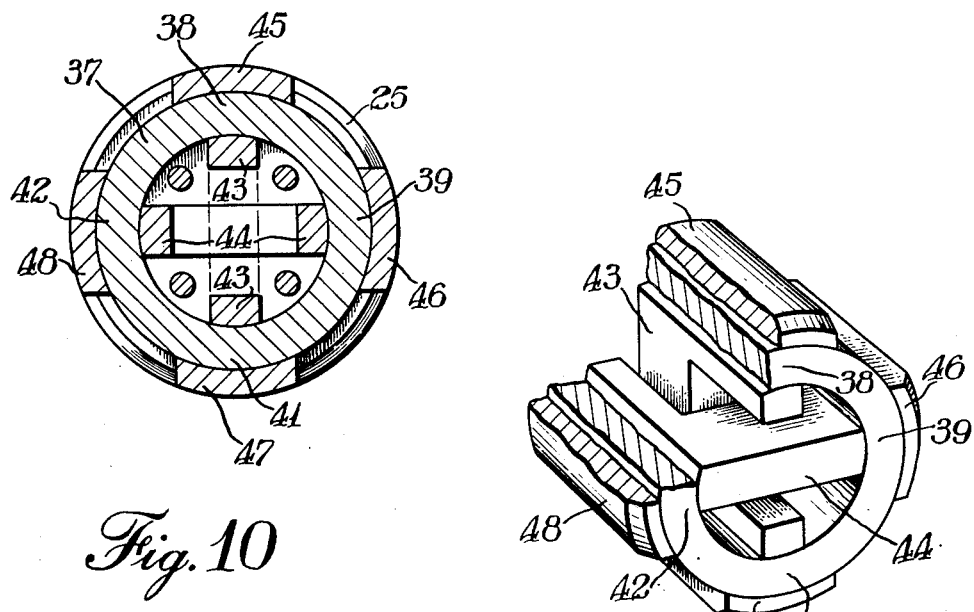
Fig. 10
Fig. 11
Witness:
Burr W. Jones
INVENTOR
Walter J. Spengler
BY Clinton S. Janes
ATTORNEY Patented Nov. 10, 1936

2,060,259

UNITED STATES PATENT OFFICE 2,060,259

MAGNETO GENERATOR

Walter J. Spengler, Sidney, N. Y., assignor to Bendix Aviation Corporation, South Bend, Ind., a corporation of Delaware Application November 28, 1934, Serial No. 755,176

6 Claims. (Cl. 171—209)

This invention relates to magneto generators and more particularly to an improved form of magneto rotor for such devices.

In designing magneto rotors for a certain desired energy output, it is necessary to provide magnets which when incorporated in the magnetic circuit of the magneto and properly rotated will have the proper combination of such coercive force and such flux as to produce the desired energy through the magnetic circuit. With a given magnetic material, the coercive force of the magnet depends on its effective length, and the flux depends on its cross-sectional area, and inasmuch as the diameter of a magneto rotor for ignition purposes is fairly well determined by present commercial design, the solution of the problem of providing adequate length and cross-section of magnets has heretofore been approached by forming the magnets of longitudinally arranged bars joined at one end to form U-shaped magnets. This arrangement permits the attainment of the desired coercive force by the use of a rotor of sufficient length for the purpose. However, in a 4-pole rotor of the dimensions commonly used, the necessity of providing spaces between the poles to prevent magnetic leakage limits the cross-section of the magnets so that with some materials there is difficulty in obtaining the desired flux.

Thus, for instance, when chrome magnet steel is used, the specific coercive force is not so great as with some other alloys so that comparatively long bar magnets are needed to obtain the desired coercive force, but since the permeability of chrome magnet steel is comparatively high, it is possible to obtain the desired flux in a rotor of conventional diameter. On the other hand, the coercive force of cobalt magnet steel is considerably greater than chrome magnet steel, so that magnets of cobalt steel can be correspondingly shorter, but since the permeability of cobalt steel is less, there is some difficulty in obtaining the desired flux in the standard diameter rotor.

There has quite recently been developed an entirely new magnetic alloy of iron, nickel and aluminum, the coercive force of which is very much greater than any previously known magnet steel, although its permeability is somewhat less than that of either cobalt or chrome magnet steel. It is an object of the present invention to take advantage of the peculiar properties of this new material in providing a novel magnetic rotor of standard diameter and very short length which produces all the coercive force required, while the flux may be increased to any desired extent by simply increasing the length of the rotor.

It is another object to provide such a rotor which is of high magnetic efficiency and stability.

It is a further object to provide such a rotor which is simple and symmetrical in design and of great mechanical strength and rigidity.

Further objects and advantages will be apparent to those skilled in this art from the following description taken in connection with the accompanying drawings in which:

Fig. 9 is a side elevation partly in section of a third embodiment of the invention;

Fig. 10 is a section taken substantially on the line 10—10 of Fig. 9; and

Fig. 11 is a detail in perspective of the magnet, bridging members and pole piece structure, the magnet and pole pieces being partially broken away.

Figure 1:
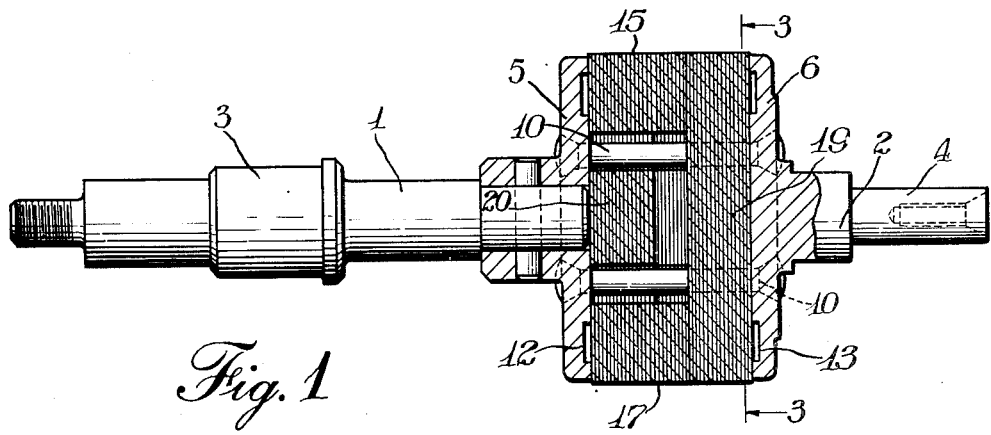
Fig. 1 is a side elevation partly in section of one preferred embodiment of the present invention.

Referring first to Fig. 1 of the drawings, there is illustrated a magneto rotor comprising a drive shaft comprising sections 1, 2 having suitable bearing portions 3 and 4 respectively for mounting in a magneto frame, and formed integral with or rigidly attached to a pair of non-magnetic terminal members or clamping plates 5 and 6 respectively.

Figure 2:
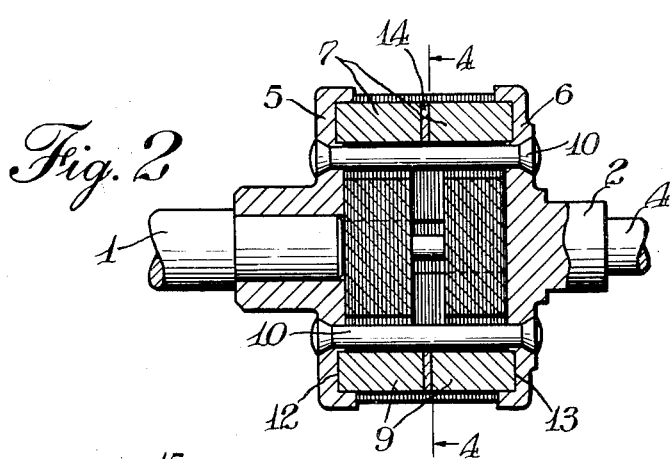
Fig. 2 is a longitudinal mid-sectional view thereof.
Figure 3:
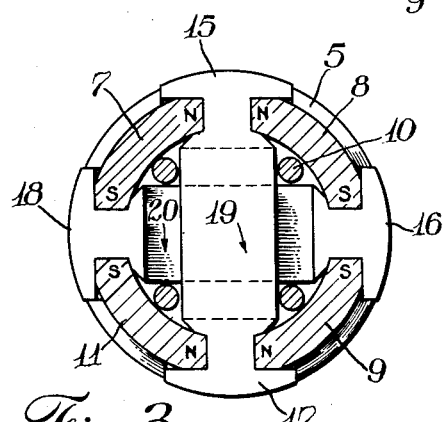
Fig. 3 is a section taken substantially on the line 3—3 of Fig. 1.
Figure 4:
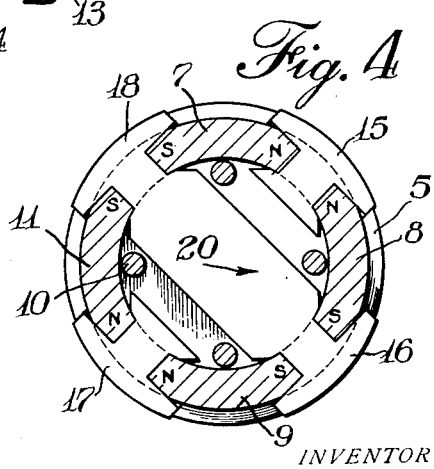
Fig. 4 is a section taken substantially on the line 4—4 of Fig. 2.
Figure 5:
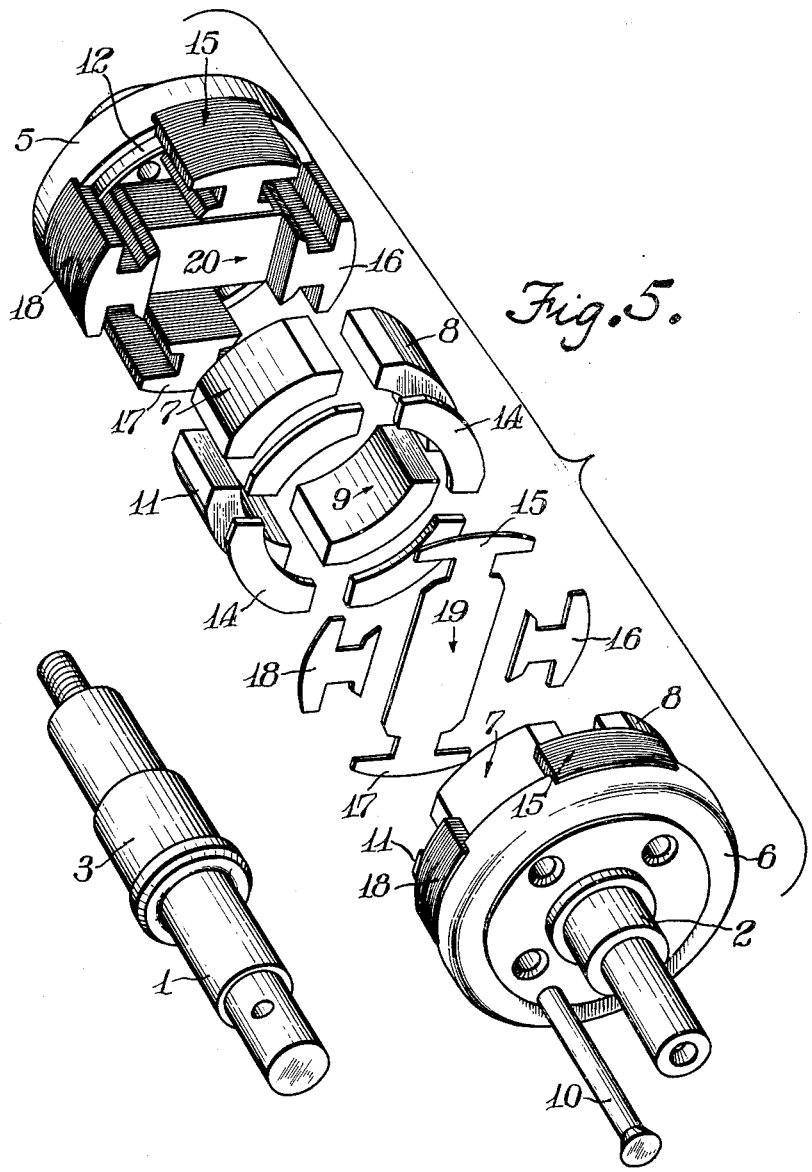
Fig. 5 is an exploded or drawn out view in perspective of the structure illustrated in Fig. 1, the main bearing portion of the shaft being shown separately for convenience.

According to the present invention, the magnets are formed as arcuate or quadrantal bars or segments 7, 8, 9, and 11 (Figs. 3 and 4) of the new magnetic alloy referred to, having high coercive force, circularly arranged between the end plates 5 and 6, the edges thereof sitting in arcuate recesses 12 and 13 formed in said end plates respectively. These magnets are shown in Fig. 2 as being formed in pairs separated by a non-magnetic spacer such as a brass washer 14, but it will be understood that the pairs of magnets may be formed integral if so desired. Like poles of adjacent magnets are arranged adjacent each other as indicated in Figs. 3 and 4, and pole pieces 15, 16, 17, and 18 of suitable highly permeable material such as soft iron laminations are arranged to receive the poles of adjacent magnets and conduct the flux therefrom into the external magnetic circuit, not illustrated.

In order that all the magnets may be used simultaneously in conjunction with an ordinary 2-pole stator, and in order to conserve the strength of the magnets by maintaining their magnetic circuits closed, opposite pairs of pole pieces are connected by bridging members extending diametrically across the interior of the ring formed by the arcuate magnets. In order that these bridging members may not reduce the efficiency of the rotor by magnetic leakage therebetween, they are axially spaced from each other as far as the dimensions of the rotor will permit. Thus pole pieces 15 and 17 are connected by a bridging member 19 located at the right hand end of the rotor as viewed in Figs. 1 and 2, while pole pieces 16 and 18 are connected by a bridging member 20 at the left hand end of the rotor. It will be understood that these bridging members are preferably formed of the same material as the pole pieces and may, as shown, be formed integral with the contiguous laminations thereof.

As previously stated, the arcuate magnets 7, 8, 9, and 11 are formed of the new magnetic alloy above described having very high specific coercive force so that it is possible to obtain the desired coercive force for these magnets in the very limited length to which they are restricted by their circumferential arrangement as shown. Inasmuch, however, as said magnetic steel does in fact permit such arrangement, it is obvious that any desired magnetic flux may be obtained by merely increasing the cross-section of the magnets sufficiently for the purpose, such increase in cross-section being readily brought about by increasing the width of the magnets and correspondingly lengthening the rotor, without increasing its diameter. It will be understood that the rotor, even when embodying the maximum cross-sectional area of the magnets desirable, is much shorter than the conventional rotor with longitudinally arranged bar magnets of ordinary chrome or cobalt steel.

The end plates 5 and 6 with the magnets, pole pieces and bridging members are unified by any suitable means such as non-magnetic units 10.

Figure 6:
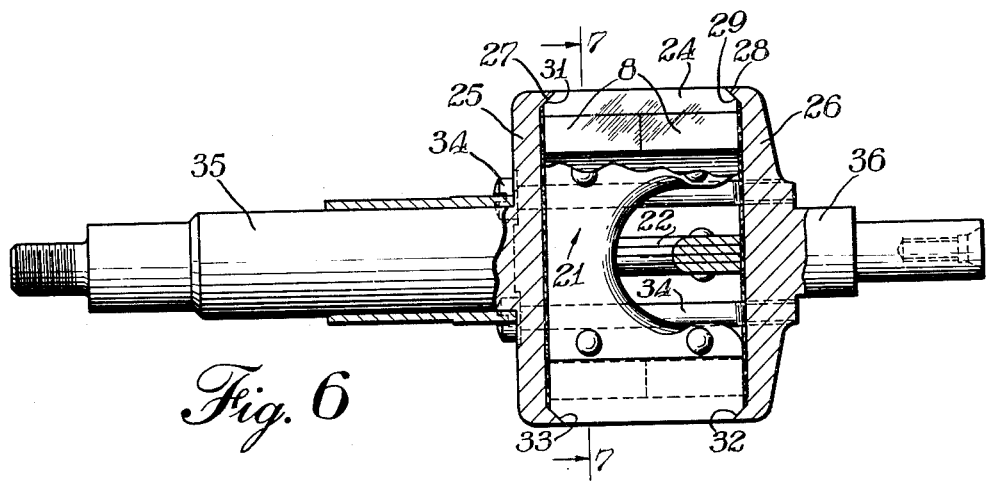
Fig. 6 is a side elevation partly in section of a second embodiment of the invention.
Figure 7:
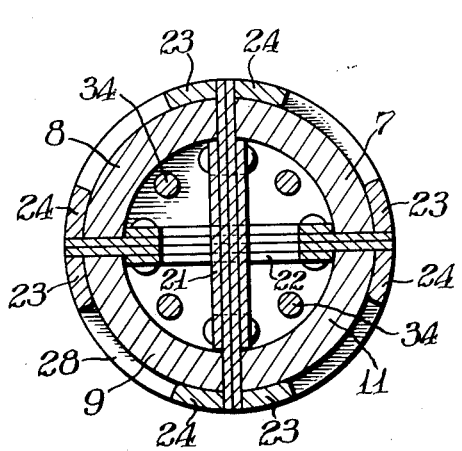
Fig. 7 is a section taken substantially on the line 7—7 of Fig. 6.
Figure 8:
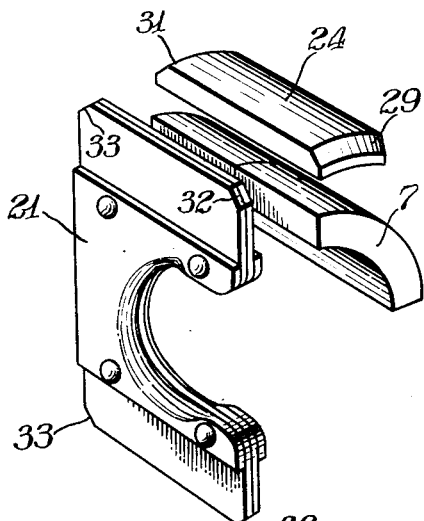
Fig. 8 is a detail in perspective of one bridging member with one pair of magnets and one pole piece member shown in spaced relation.

In the embodiment of the invention illustrated in Figs. 6, 7, and 8, the length of the arcuate magnets is somewhat increased without increasing the diameter of the rotor by the use of a different form of bridging members for connecting the poles of the magnets. Referring particularly to Figs. 7 and 8, it will be seen that the bridging members 21 and 22 are formed of axially arranged laminations of highly permeable material, a portion of which laminations extends radially between the like poles of opposed magnets. The bridging members are thickened in their intermediate portions and are U-shaped to provide clearance between the two bridging members where their planes intersect. The bridging members extend radially slightly beyond the magnets, and pole piece members 23 and 24 are located on opposite sides flush with such projecting portions.

The entire assembly of magnets, bridging members and pole pieces is unified by means of non-magnetic end plates 25 and 26 which are provided with tapered shoulders 27 and 28 overlapping the beveled ends 29 and 31 of the pole pieces and the beveled edges 32 and 33 of the bridging members. The end plates 25 and 26 are clamped together by suitable means such as bolts 34 of non-magnetic material. End plates 25 and 26 are formed on or affixed rigidly to the sections 35 and 36 of the rotor shaft in any suitable manner.

In the embodiment of the invention illustrated in Figs. 9, 10, and 11, the length of the arcuate magnets is still further increased by forming said magnets as an integral ring or sleeve 37 of said magnetic material, and magnetizing said ring to form poles 38, 39, 41, and 42 at diametrically opposite points. Bridging members 43 and 44 for connecting said poles are formed of suitable permeable material located within the magnet ring and extending diametrically and across between like poles, the bridging members extending longitudinally within the ring and being cut away in their intermediate portions in order to provide clearance.

Pole pieces 45, 46, 47, and 48 are formed to fit the exterior of the magnetic ring and are located on the poles thereof, being retained in place by end plates 25 and 26 as previously described.

It will be seen that there is here provided in all the various embodiments of the invention, a rotor which may be made of conventional diameter but, by virtue of the use of the new magnetic alloy, is capable of producing the desired coercive force; while owing to the new arrangement of the magnets in the rotor, the cross-section thereof can be increased to any desired amount so as to provide for the maximum required flux. Due to the use of the bridging elements, like poles of all magnets are at all times magnetically connected whereby all magnets cooperate when the device is used with an ordinary bi-pole stator. It will be understood that by utilizing the bridging elements illustrated in Figs. 6, 7, and 8, a slightly greater coercive force may be obtained than in the structure shown in Figs. 1 to 4, and that in Figs. 9, 10, and 11 still further coercive force may be obtained since the effective length of the magnets is still further increased. However, since the bridging elements in Figs. 9, 10, and 11 do not traverse the poles of the magnets, which poles are composed of magnetic material of lesser permeability than the bridging members, the flux transmitted through the bridging members may be somewhat less than in the other embodiments of the invention.

It will be understood that various changes may be made in the proportions and arrangements of the parts as illustrated without departing from the spirit of the invention as defined in the claims appended hereto.

What is claimed is:

1. A magneto rotor including a plurality of bar magnets forming a ring with unlike poles arranged successively, pole pieces arranged on the exterior of the ring at such poles, axially spaced magnetic bridging members extending across the interior of the ring for connecting like poles thereof, a sectional rotor shaft, end plates rigid with the adjacent ends of said sections, and means for clamping said end plates together to locate and unify the magnets, pole pieces and bridging members.

2. A magneto rotor including a plurality of magnetic segments of material having high coercive force, arranged circumferentially about the axis of the rotor in the form of a ring with the like poles of consecutive segments adjacent, and U-shaped bridging members of material having high permeability extending longitudinally in opposed relation across the faces of the magnets and diametrically across the rotor to connect the pairs of said adjacent like magnetic poles, said bridging members being centrally thickened to facilitate the passage of flux between said pairs of poles.

3. A magneto rotor including a plurality of magnetic segments of material having high coercive force, arranged circumferentially about the axis of the rotor in the form of a ring with the like poles of consecutive segments adjacent, pole pieces of material having high permeability arranged around the periphery of said ring and extending across the pairs of said adjacent like poles thereof, said pole pieces being beveled off at their ends, non-magnetic end plates having tapered peripheral shoulders adapted to extend over the beveled ends of the pole pieces, and means for clamping the end plates against the magnetic ring and pole pieces.

4. A magneto rotor including a ring of material having high coercive force, with unlike poles arranged successively thereabout, pole pieces of highly permeable material fitting exteriorly the polar sections of said ring, axially spaced bridging members of highly permeable material connecting like polar sections of said ring, non-magnetic end plates having flanges peripherally overlapping said ring, and means for clamping said end plates on said ring to unify the ring and pole pieces.

5. A magneto rotor including a plurality of magnets formed of bars extending circumferentially of the rotor, the width of said magnets being at least as great as their length from pole to pole, and pole pieces and U-shaped axially spaced bridging members of material having high permeability connecting like poles of said magnets, said bridging members being arranged longitudinally of the rotor with their arms overlapping and equally spaced about the periphery of the rotor.

6. In a magneto rotor a plurality of magnets formed of bars of material having high specific coercive force extending circumferentially of the rotor, the width of said magnets being at least as great as their length from pole to pole, arcuate pole pieces formed to receive the ends of said magnets and hold them in circularly assembled relation, opposite pairs of said pole pieces being provided with axially spaced integrally formed bridging members of highly permeable material extending across the entire width of the magnets, said bridging members being arranged longitudinally of the rotor with their arms overlapping and equally spaced about the periphery of the rotor, a drive shaft, and means for centering and compressing said magnets and pole pieces and coupling the unit so formed to said shaft.

WALTER J. SPENGLER.